(12) United States Patent
Knight et al.

(10) Patent No.: US 9,346,343 B1
(45) Date of Patent: May 24, 2016

(54) ROLLING COVER SYSTEM MOTOR MOUNT

(71) Applicant: Steven J. Knight, Mission Hill, SD (US)

(72) Inventors: Steven J. Knight, Mission Hill, SD (US); James Edward Elsen, Yankton, SD (US)

(73) Assignee: Shur-Co, LLC, Yankton, SD (US)

( * ) Notice: Subject to any disclaimer, the term of this patent is extended or adjusted under 35 U.S.C. 154(b) by 0 days.

(21) Appl. No.: 14/567,692

(22) Filed: Dec. 11, 2014

Related U.S. Application Data (63) Continuation of application No. 13/611,340, filed on Sep. 12, 2012, now Pat. No. 9,283,832.

(60) Provisional application No. 61/533,521, filed on Sep. 12, 2011.

(51) Int. Cl.
*B60J 11/00* (2006.01)
*B60J 7/08* (2006.01)
*B60P 7/04* (2006.01)

(52) U.S. Cl.
CPC ... *B60J 7/085* (2013.01); *B60P 7/04* (2013.01)

(58) Field of Classification Search
CPC ...... B62D 35/001; B62D 35/00; B61D 17/02; Y02T 30/32; Y02T 50/166; E05Y 2900/55; E05F 11/445; Y10T 292/1082; B25J 17/02; E05B 81/06
USPC ...................................... 296/98; 105/1.1, 1.2
See application file for complete search history.

(56) References Cited

U.S. PATENT DOCUMENTS

| | | |
|---|---|---|
| 3,549,197 A | 12/1970 | Sibley |
| 3,549,199 A | 12/1970 | Sibley |
| 3,628,826 A | 12/1971 | Sibley |
| 3,868,142 A | 2/1975 | Bachand |
| 4,082,347 A | 4/1978 | Petretti |
| 4,126,351 A | 11/1978 | Peteretti |
| 4,516,802 A | 5/1985 | Compton |
| 5,803,528 A * | 9/1998 | Haddad, Jr. ............... B60J 7/085 296/100.16 |
| 5,829,819 A | 11/1998 | Searfoss |
| 5,924,758 A | 7/1999 | Dimmer |
| 6,916,060 B2 | 7/2005 | Searfoss |
| 7,032,950 B2 | 4/2006 | Eggers |
| 7,188,887 B1 * | 3/2007 | Schmeichel .......... B60P 7/0876 296/100.14 |
| 7,195,304 B1 | 3/2007 | Schmeichel |
| 7,726,720 B2 * | 6/2010 | Searfoss ................... B60J 7/085 296/100.01 |
| 8,056,955 B1 * | 11/2011 | Schmeichel ............. B60J 7/085 296/100.14 |
| 8,172,301 B2 * | 5/2012 | Searfoss ................... B60J 7/085 296/98 |
| 8,177,284 B1 * | 5/2012 | Royer ...................... B60J 5/067 296/100.16 |
| 8,215,698 B1 * | 7/2012 | Rogers ..................... B60J 7/085 296/98 |
| 8,226,150 B1 * | 7/2012 | Schmeichel ............. B60P 7/04 296/100.15 |
| 8,360,502 B2 * | 1/2013 | Kartes ...................... B60J 7/085 296/100.14 |
| 8,496,283 B1 * | 7/2013 | Schmeichel ............. B60J 7/085 296/100.16 |
| 8,641,123 B1 * | 2/2014 | Royer ...................... B60J 7/085 296/100.11 |
| 8,783,756 B2 * | 7/2014 | Schmeichel ............. B60P 1/26 296/100.14 |

(Continued)

*Primary Examiner* — Kiran B Patel
(74) *Attorney, Agent, or Firm* — Jeffrey A. Proehl; Woods, Fuller, Shultz & Smith, P.C.

(57) ABSTRACT

A motorized rolling cover system for covering the top of an open-top vehicle. The system includes a cover, a shaft, a motor assembly, an arm assembly and a motor mount that supports the motor assembly on the arm assembly. The motor mount is pivotally attached to the end of the arm assembly to provide pivotal movement of the mount in a single plane. The plane of pivotal movement is either the same as (i.e., parallel to) the plane defined by the arm and the shaft, or is perpendicular to the arm-shaft plane.

7 Claims, 10 Drawing Sheets

(56) References Cited

U.S. PATENT DOCUMENTS

| | | | | |
|---|---|---|---|---|
| 9,150,086 B1* | 10/2015 | Royer | | B60J 7/085 |
| 2003/0052505 A1* | 3/2003 | Searfoss | | B60J 7/085 296/98 |
| 2003/0151271 A1* | 8/2003 | Leischner | | B25B 13/48 296/98 |
| 2004/0239142 A1* | 12/2004 | Poyntz | | B60J 7/085 296/98 |
| 2010/0230993 A1* | 9/2010 | Bremer | | B60J 7/085 296/98 |
| 2013/0036936 A1* | 2/2013 | Searfoss | | B60J 7/085 105/377.02 |
| 2013/0241230 A1* | 9/2013 | Knight | | B60J 7/085 296/98 |
| 2013/0249236 A1* | 9/2013 | Smith | | B65D 90/66 296/98 |
| 2013/0313855 A1* | 11/2013 | Schmeichel | | B60J 7/085 296/98 |
| 2014/0203589 A1* | 7/2014 | Bremer | | B60J 7/085 296/98 |
| 2014/0265424 A1* | 9/2014 | Bremer | | B60J 7/085 296/98 |

* cited by examiner

ROLLING COVER SYSTEM MOTOR MOUNT

REFERENCE TO RELATED APPLICATION

This application is a continuation of U.S. Non-provisional patent application Ser. No. 13/611,340, filed Sep. 12, 2012, and claims priority to U.S. Provisional Patent Application Ser. No. 61/533,521, filed on Sep. 12, 2011, and the contents of each application are incorporated by reference.

FIELD OF THE INVENTION

The invention relates generally to rolling cover systems. More particularly, it relates to motorized rolling cover systems for open-top vehicles such as grain trailers.

BACKGROUND OF THE INVENTION

Open-top vehicles are commonly used to transport bulk products such as grain and sand because the opening enables the bulk product to be quickly deposited into the vehicle from above. A drawback of the open top is that the product may be blown or jostled out of the open top of the vehicle as it moves down the road. The lost material not only reduces the amount of the load ultimately delivered to its final destination, but also may hit or otherwise damage other vehicles or persons on the road.

Another drawback of open top vehicles is that the product is exposed to the ambient environment such as rain, hail, snow, high winds and direct sunlight. Those factors may damage the product. For example, bulk grain is vulnerable to rain and snow.

Canvas and vinyl covers were developed to cover the open top. Early systems incorporated hardware that rolled the cover between an open configuration on one side of the top of the truck box or trailer and a closed configuration in which the cover was spread over the top and secured in position. Examples of manually operated cover systems are disclosed in Sibley, U.S. Pat. No. 3,546,197; Sibley, U.S. Pat. No. 3,549,199; Sibley, U.S. Pat. No. 3,628,826; Bachand et al., U.S. Pat. No. 3,868,142; Peteratti, U.S. Pat. No. 4,082,347; Peteratti, U.S. Pat. No. 4,126,351; Dimmer U.S. Pat. No. Re. 31,746, and Compton, U.S. Pat. No. 4,516,802.

In the Dimmer prior art patent, a crank shaft is connected to the roll tube (that carries the cover) by a Universal joint. The U-joint allows the crank shaft to be used in two ways. First, it is used for rolling and unrolling, by pulling the shaft away from the trailer, and rotating it. Because the U-joint is unlocked when the shaft is moved away from the trailer, the rotational movement of the crank is transmitted to rotate the tube. Rotation of the roll tube unfurls the material on the roll shaft across the open top to cover it.

The second use of the U-joint is to lock the roll tube in place. When the rolling or unrolling described above is completed, the operator brings the shaft the back toward the trailer to a more perpendicular orientation relative to the roll tube. In this position, the U-joint is locked and further rotational movement of both the crank and the tube is prevented. This is the configuration when the truck box or trailer is moved on the highway.

More recently, motorized cover systems were developed. Such systems eliminated the crank shaft and U-joint, and attached an electric motor to the end of the roll shaft where the U-joint was previously located. An arm supported the motor in place at the height of the top of the truck box or trailer as it rolled the roll shaft from one side of the trailer to another. The arm also secured the motor against counter rotational forces resulting from the torque applied by the motor to the roll shaft. The other end of the arm was pivotally attached to the trailer to allow the arm to sweep across the front of the trailer from open to closed position, or in the reverse direction.

A motorized cover system is shown in Schmeichel, U.S. Pat. No. 7,188,887 (see also U.S. Pat. No. 7,195,304). It shows a cover system with motor attached to the end of a roll shaft to roll the shaft from an open or unrolled position to a closed configuration. The motor is mounted on an arm assembly that includes two arm sections that are flexibly connected to each other.

In typical prior art motorized cover systems, the motor is welded or otherwise rigidly attached to the arm, as illustrated in FIG. 2 of the Schmeichel patent. The rigidity of the attachment transferred the torque of the motor to the roller or roll shaft. Some movement of the motor in a generally upward direction was allowed by the flexible connection between the two arm sections. This accommodated the variance in distance between the pivot point of the arm attachment to the truck and the top of the trailer (or heap load extending above the top of the trailer). However, because the motor was rigidly connected both to the arm and the roll shaft, the second arm section-shaft angle never varied.

This operation is not problematic if all the components are truly square and perpendicular (or close to perpendicular) both when manufactured and during the life span of the cover system. In reality, trailers not fabricated to perfect specifications, and arms and roll tubes may be bent during installation. Further departure from optimum angles occurs during use over time as a result of collisions with loading machinery, other vehicles, or materials on their way into or out of the box or trailer.

An example of a departure from desired angles and specifications occurs when the roll tube or shaft becomes bent. In this situation, the angle of the axis of the portion of the roll shaft attached to the motor varies from a right angle with the arm. If the axis of the end of the shaft angles downward relative to the axis of a perfectly straight (not bent) shaft, there is a force applied against the arm-shaft connection toward expanding the angle to more than 90 degrees. On the other hand, if the shaft angles upward, there is a force applied against the arm-shaft connection toward reducing the angle to less than 90 degrees.

In the bent shaft situation, the rolling and unrolling operations continuously varies the angle of the force on the arm-shaft connection. During a single rotation, there will be substantial force to try to narrow the arm-shaft angle to less than 90 degrees against the rigid connection, as well as substantial force trying to widen the angle. (It will also twist the second arm section to the right and the left.) The center line of the drive shaft of the motor (or transmission) attempts to follow the axis of the roll tube and twist about both the vertical and horizontal axes, transferring this force to the weld or other rigid attachment between the motor or motor mount and the arm.

During the entire opening or closing operation, there are many rotations, creating an oscillating stress at this attachment, down the arm and across the length of the shaft. Over time, this creates excessive wear and premature deterioration of the cover and metal parts, and potentially the catastrophic failure of the arm-motor connection.

SUMMARY OF THE INVENTION

The motorized cover system contemplated herein includes many of the same structural features described above for prior art motorized cover systems. However, destructive oscillating stresses at the arm-shaft connection, down the arm and along the shaft are now at least partially relieved. This is accomplished without loss of the rigidity needed to transfer the torque of the motor to the end of the roll shaft. Hence, the problem is reduced or eliminated, without prejudicing either the transfer of torque from motor to shaft or the integrity of arm-shaft connection.

This improvement is obtained by providing a structure that allows the motor mount to pivot relative to the end of the arm to which it is mounted. The motor resides in a conventional mount, but the attachment of the mount to the end of the arm allows a hinge-type movement in a single plane. The motor can move in response to the oscillating forces described above and the stress at the arm-shaft connection, and down the arm or along the shaft, are reduced or eliminated.

The solution contemplated herein includes two different, hinge-type embodiments. In one, the motor or motor mount attachment to the arm allows movement in a plane that is perpendicular to the plane defined by the upper section of the arm and the roll shaft. In the other, the attachment allows movement in a plane that is parallel to the plane defined by the upper arm section and the roll shaft. A third alternative utilizes a resilient, flexible material for the mount that allows limited movement of the mount in response to the oscillating force. The limited nature of the movement provided by these connections preserves the necessary stability of the motor or motor mount relative to the arm needed to assure that the motor's torque is efficiently transferred to the roll shaft.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of the subject matter contemplated herein. Other embodiments, though not specifically described herein, and many of their intended advantages, will be appreciated by reference to the following details, without limitation to the true scope of the inventive subject matter. In the drawings, the various parts are not necessarily to scale relative to each other, and like reference numerals designate corresponding similar parts.

DETAILED DESCRIPTION OF THE PREFERRED EMBODIMENTS

Multiple embodiments are described herein. The first embodiment, shown in FIGS. 1-6, provides for pivotal movement of the motor assembly in one plane. A second embodiment, shown in FIGS. 7-10, provides for pivotal movement in a different plane. Both accomplish similar benefits and objectives.

Figure 1:
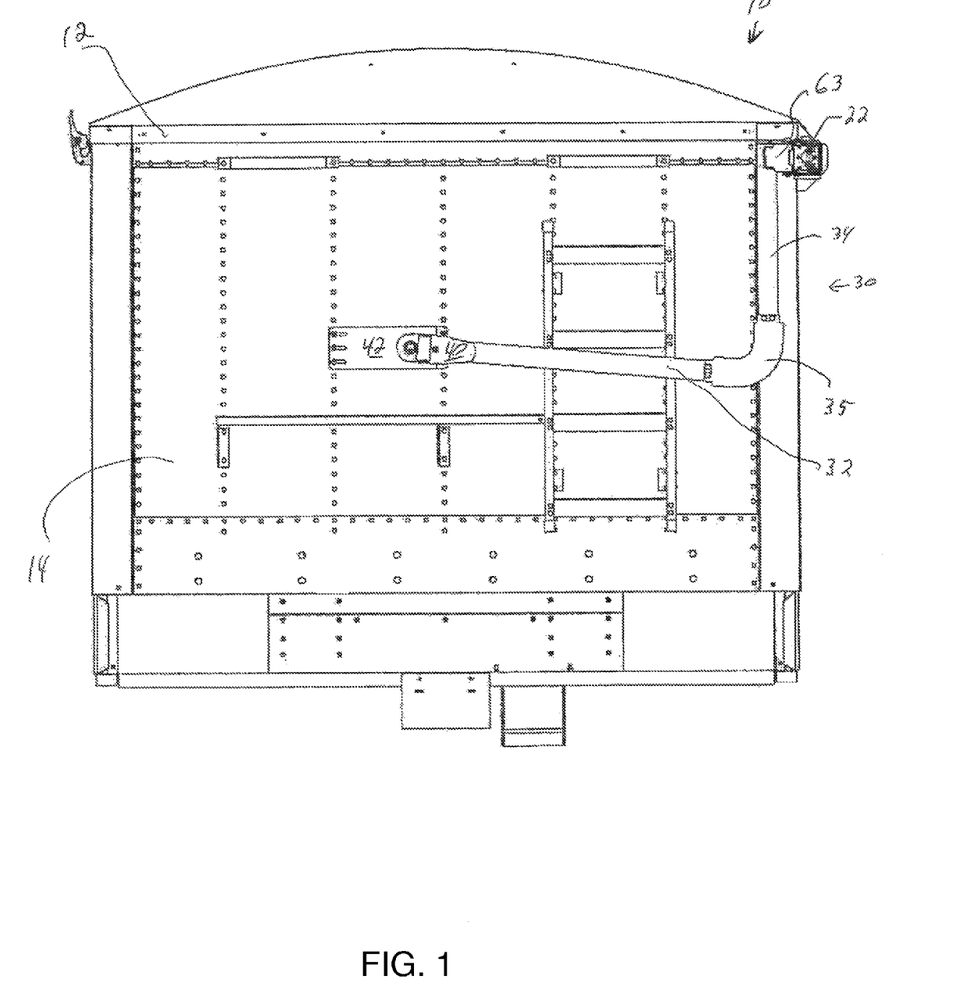
FIG. 1 is a front view of a trailer in which a first embodiment of the motorized rolling cover system is mounted.
Figure 2:
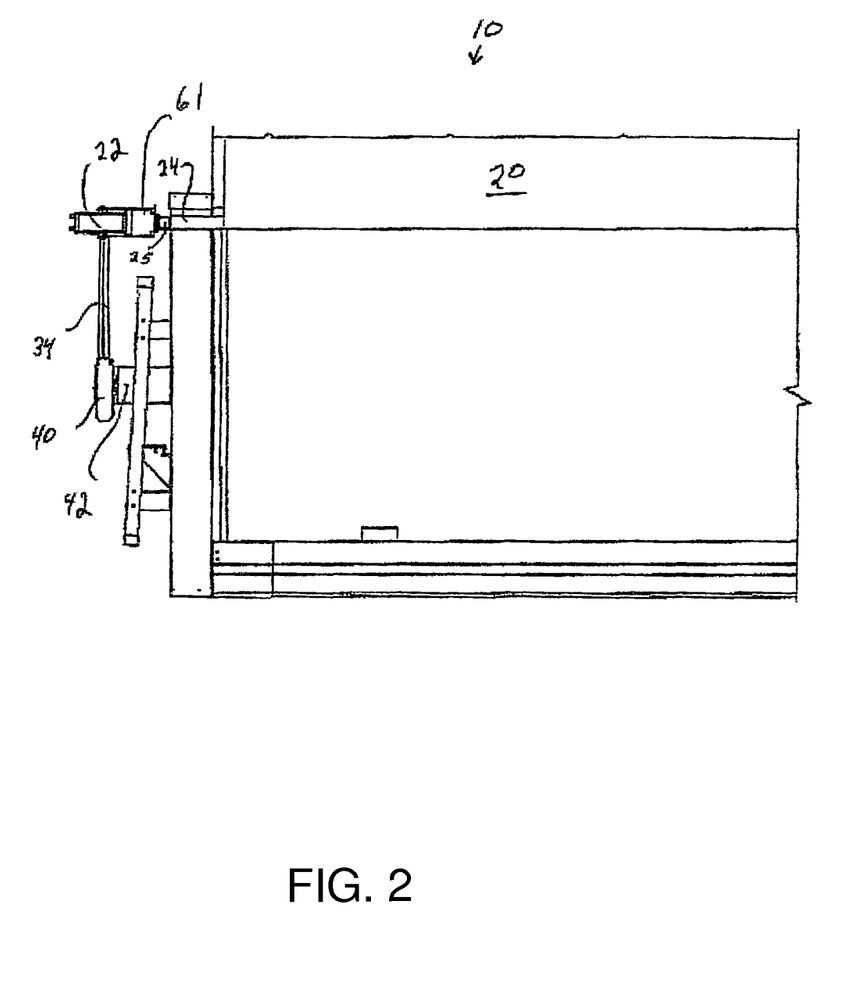
FIG. 2 is a side view of a trailer in which the first embodiment has been mounted.
Figure 3:
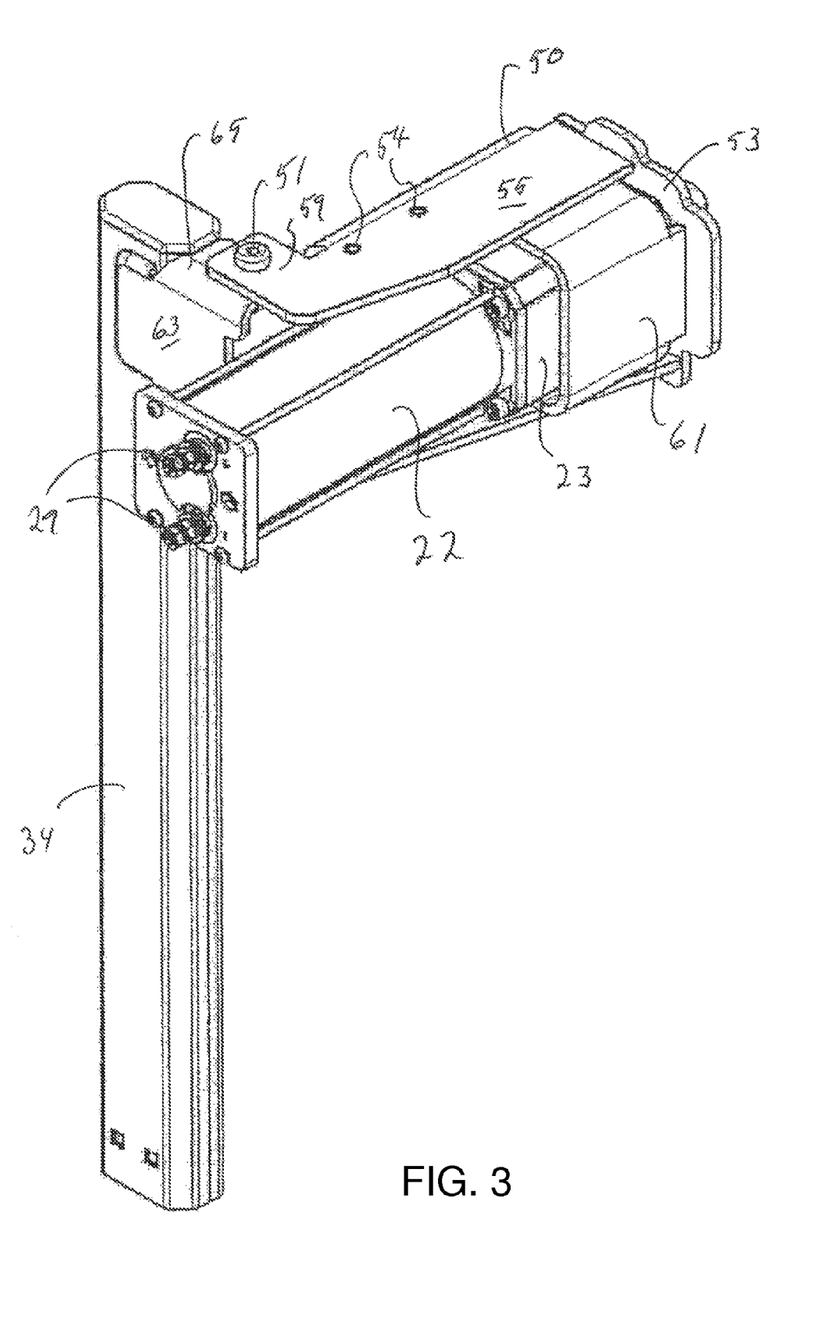
FIG. 3 is a perspective view of the second arm section, motor mounting and electric motor assembly of the first embodiment.
Figure 4:
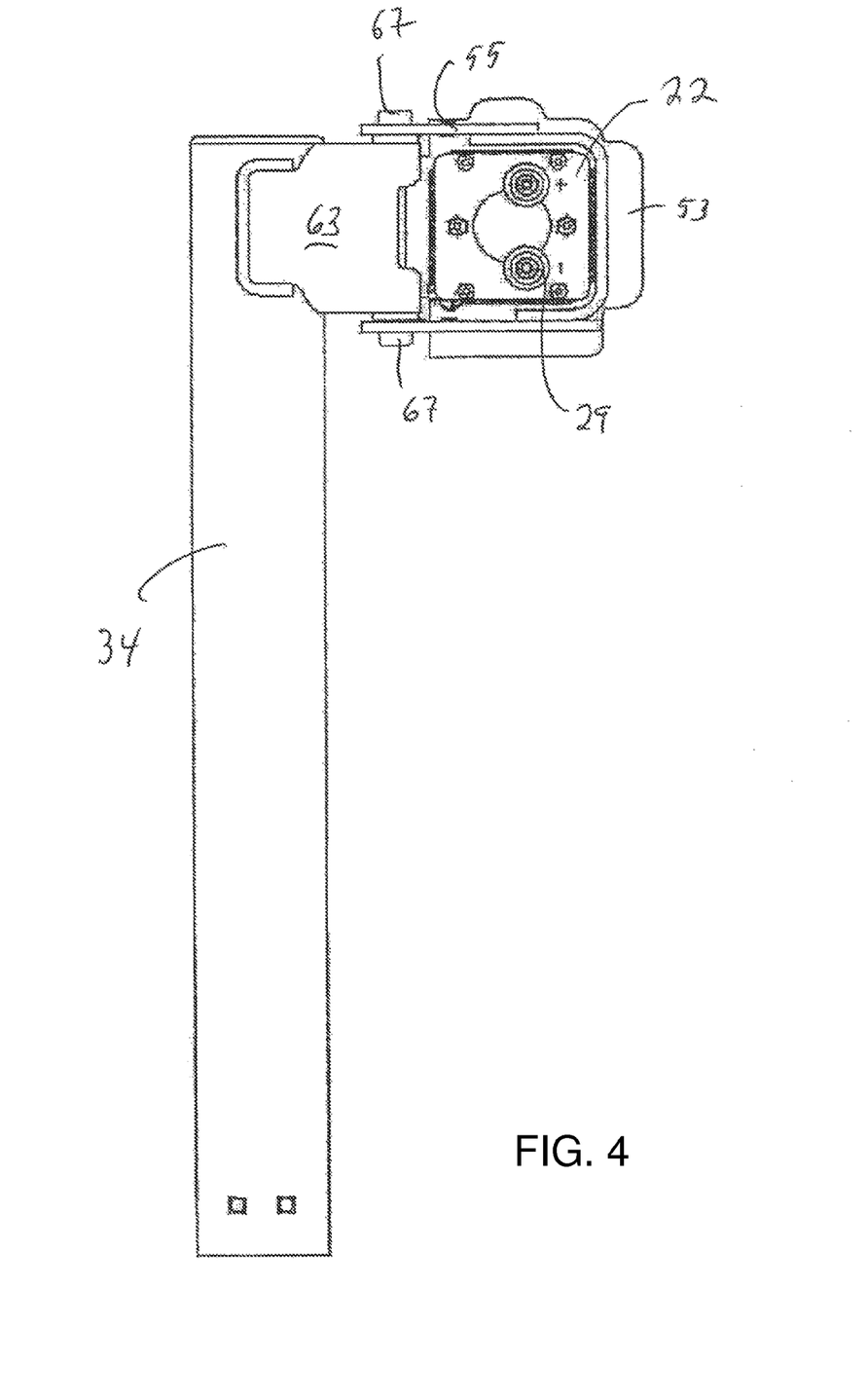
FIG. 4 is a front view of the second arm section, motor mounting and electric motor assembly of the first embodiment.
Figure 5:
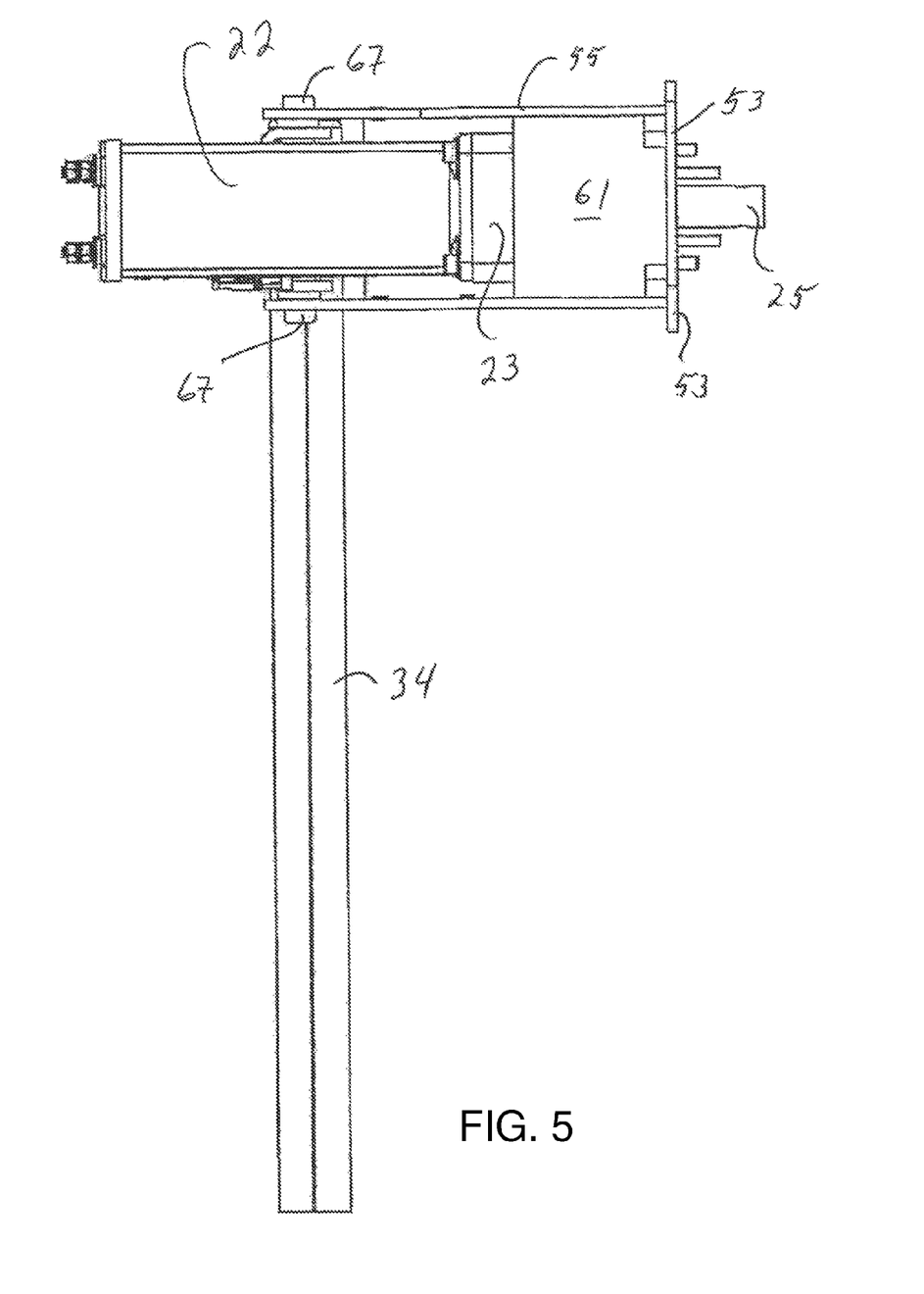
FIG. 5 is a side view of the second arm section, motor mounting and electric motor assembly of the first embodiment.
Figure 6:
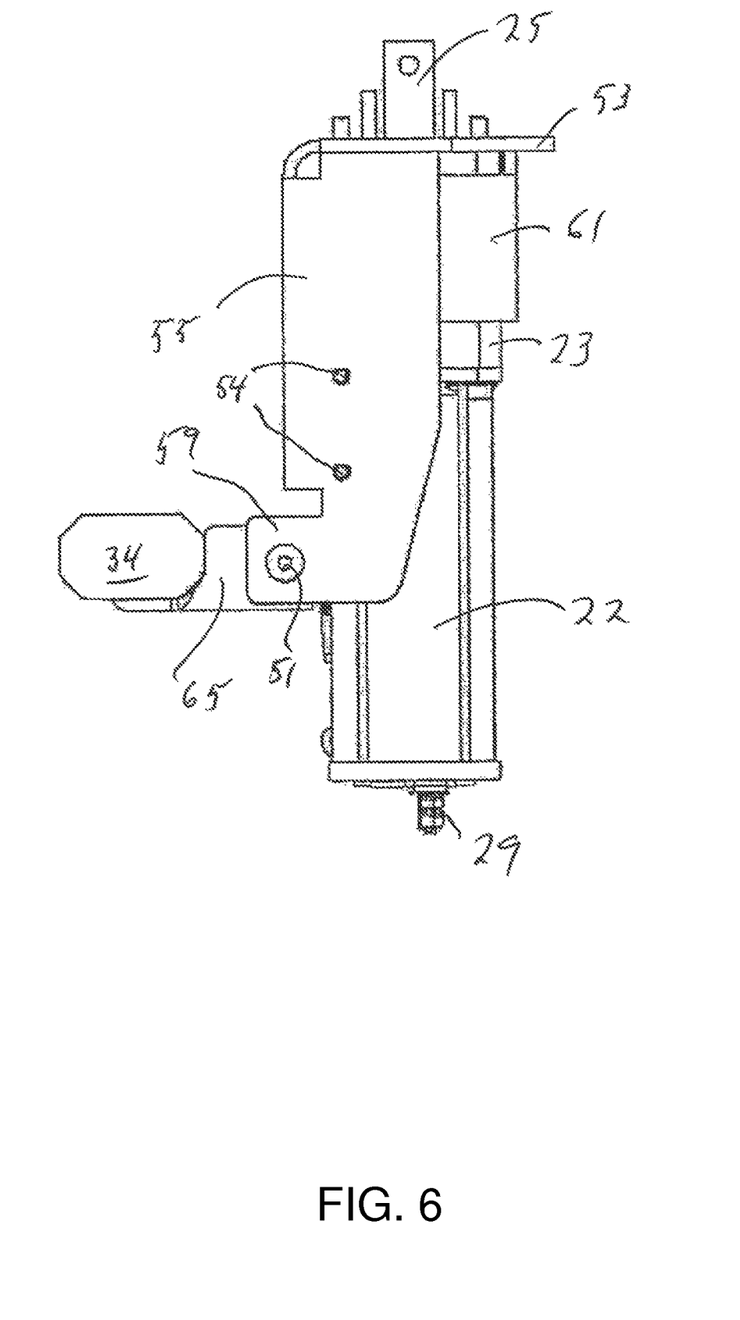
FIG. 6 is a top view of the second arm section, motor mounting and electric motor assembly of the first embodiment.
Figure 7:
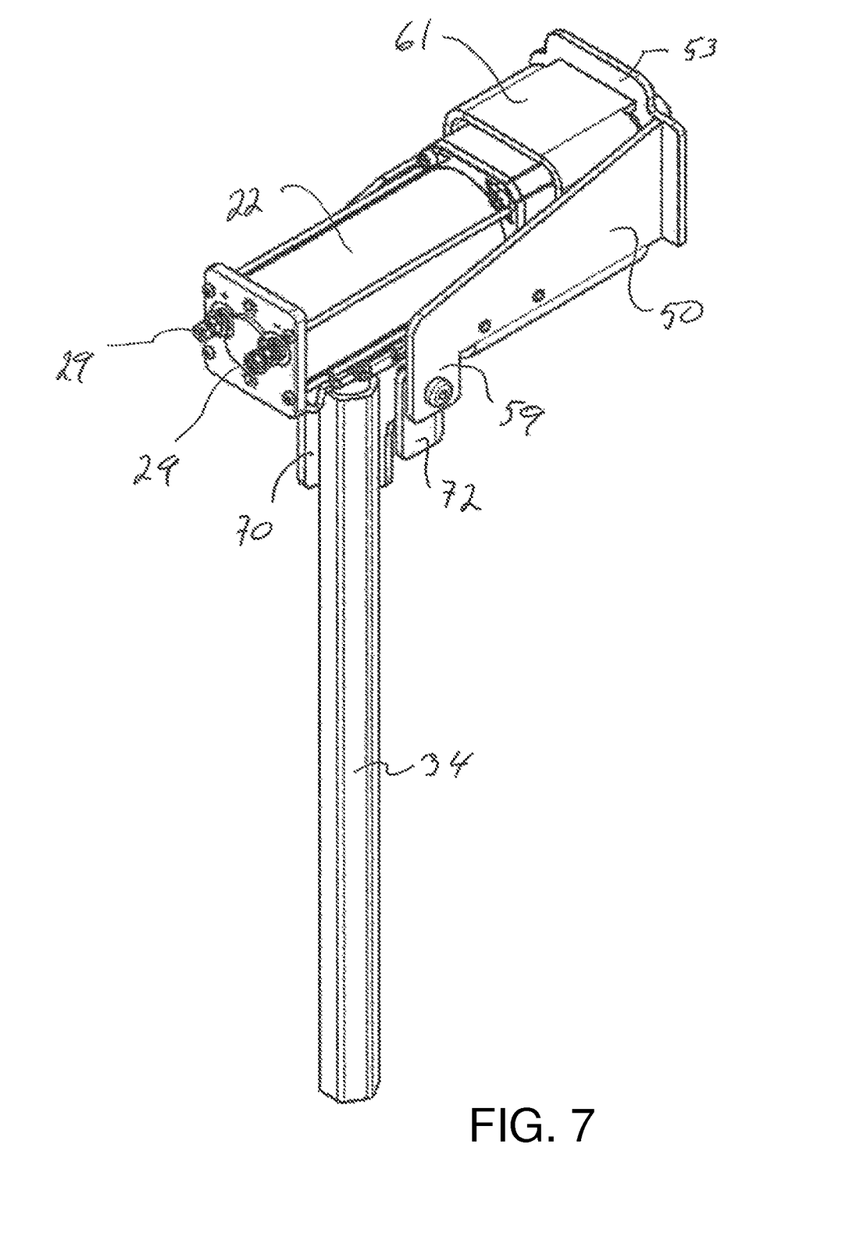
FIG. 7 is a perspective view of the second arm section, motor mounting and electric motor assembly of a second embodiment of the motorized rolling cover system.
Figure 8:
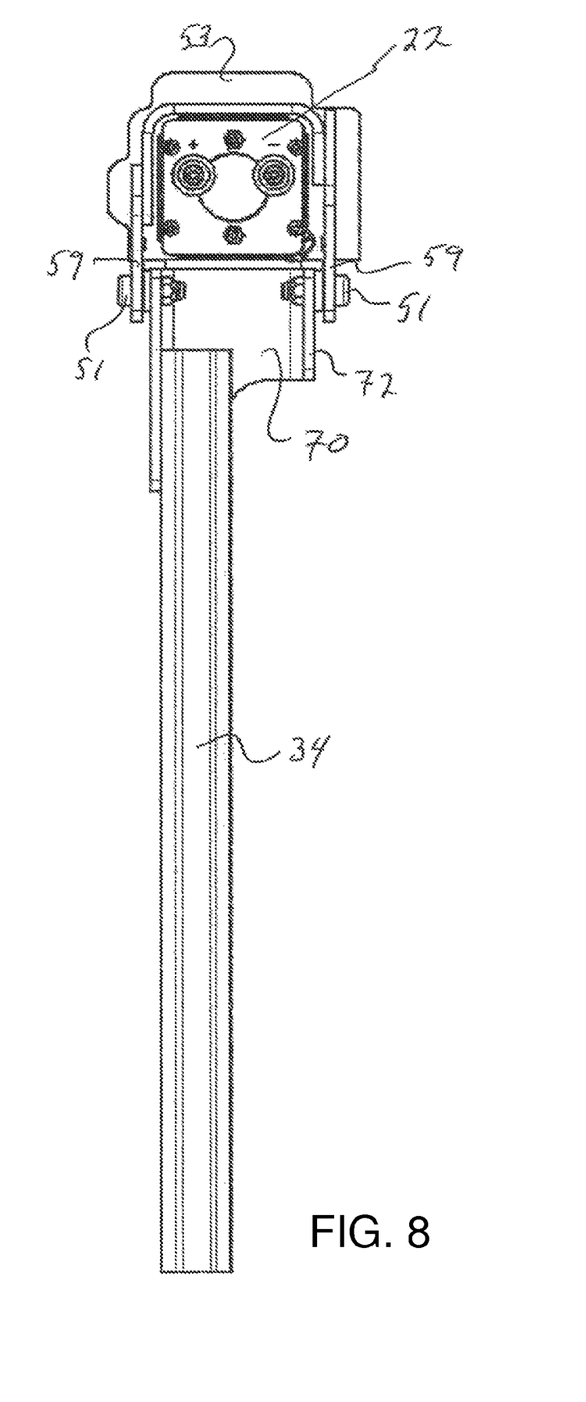
FIG. 8 is a front view of the second arm section, motor mounting and electric motor assembly of the second embodiment.
Figure 9:
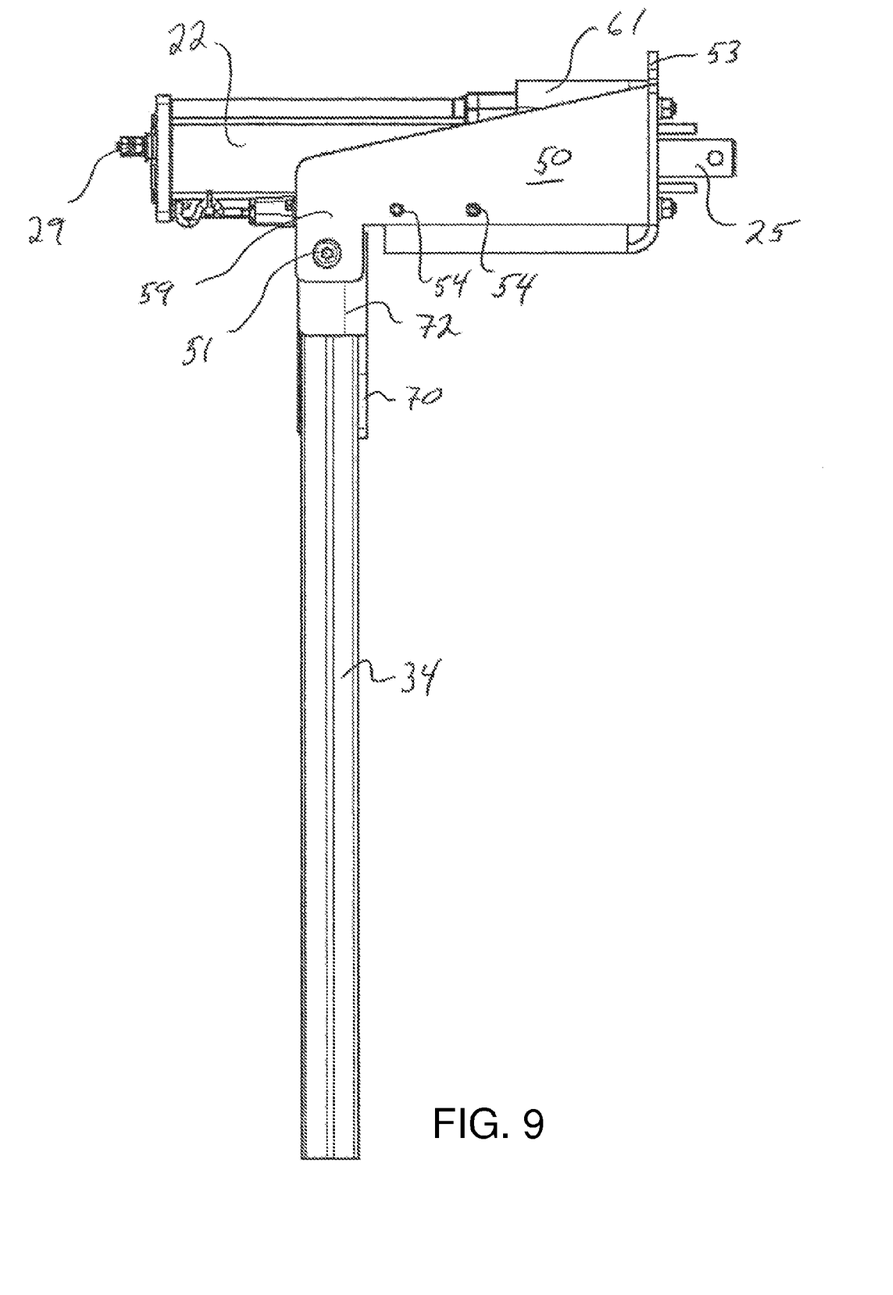
FIG. 9 is a side view of the second arm section, motor mounting and electric motor assembly of the second embodiment.
Figure 10:
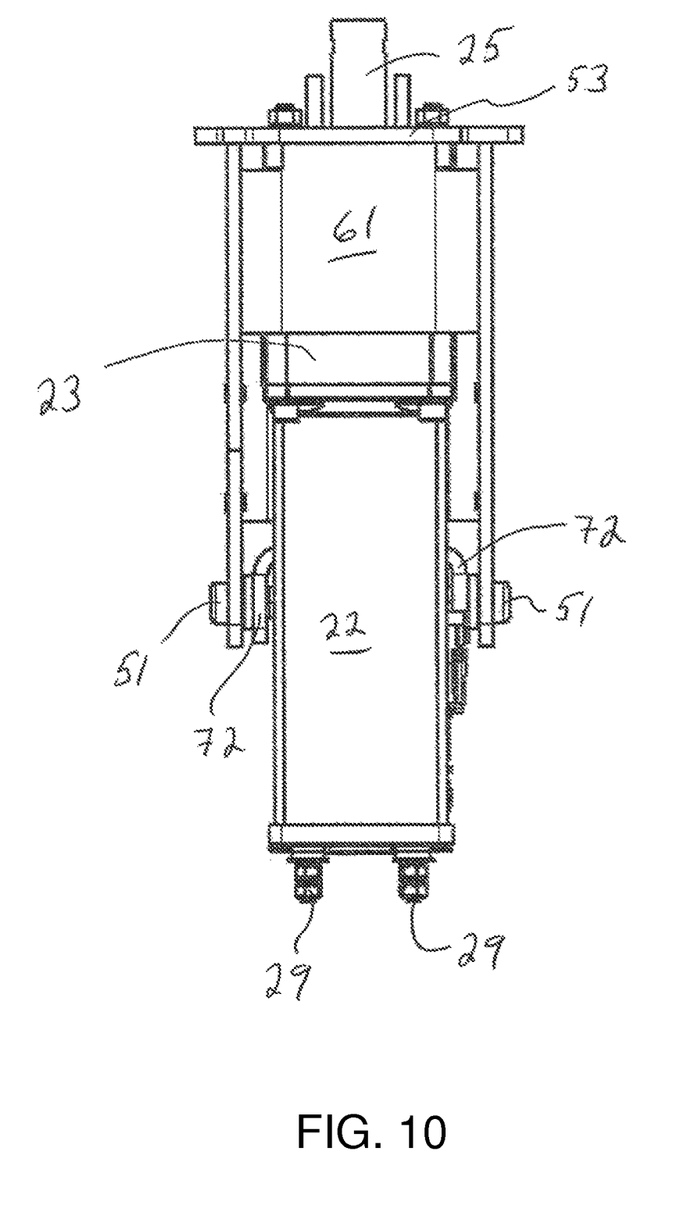
FIG. 10 is a top view of the second arm section, motor mounting and electric motor assembly of the second embodiment.

With respect to FIGS. 1 and 2, a rolling cover system 10 is used in conjunction with an open-top vehicle 12 for transporting bulk product like grain. The open-top vehicle 12 includes front, back and side walls that extend from a base wall and that together define an enclosed region in which the bulk product may be placed. The open top of the vehicle 12 facilitates placing and removing bulk product into the space enclosed by the walls.

The motorized rolling cover system 10 enables a cover 20 to be moved between an open configuration and a closed configuration without an operator needing to manually operate the rolling cover system 10 by rotating a crank. Such a motorized rolling cover system 10 may not only operate more quickly than the manual system but also does not require the operator to stand outside and be exposed to environmental elements such as rain, hail, snow, or cold or hot temperatures while operating the rolling cover system 10. The cover 20 may be a tarp made of vinyl, canvas or other flexible material known for such a use.

The rolling cover system 10 includes a motor assembly 22 mounted on the end of a roll shaft 24 on which the cover 20 is rolled. The motor assembly includes a motor, brake (not separately shown) and three-stage planetary transmission 23. Typically, the motor provides about 250 ft-lbs. of torque output, and the transmission reduces the RPM's and increases the torque by a factor of 120:1.

The motor has a drive shaft that is operably connected to an input shaft of a transmission 23. The transmission 23 also has an output shaft 25, that shaft 25 is rigidly connected to the roll shaft 24. Preferably, the connection transmission output shaft 25 is coaxial to the roll shaft 24. The motor assembly 22 causes the roll shaft 24 to rotate about its longitudinal axis to move the cover 20 between the rolled configuration and the unrolled configuration. When the cover 20 is in the rolled configuration, the cover 20 is wrapped around the shaft 24. When the cover is in the unrolled configuration, it covers the opening of the open-top vehicle.

The motor assembly 22 may vary and still take advantage of the benefits provided by the rolling cover system 10 considered herein. The motor of motor assembly 22 is preferably electric with power for the motor 22 provided by a wire or wires that are routed to the power studs 29 of motor 22 through an arm assembly 30, the structure of which is discussed in more detail below.

The motor assembly 22 is attached to the arm assembly 30. The arm assembly 30 may be a single arm or, preferably, includes two arm sections. The first arm section 32 is attached to the second arm section 34 by a flexible elbow 35. The flexible elbow 35 allows the second arm section 34 to bend relative to the first arm section 32. Typically, the elbow 35 is spring biased to orient the two arm sections coaxially to one another. Such flexibly attached arm sections have been previously used, as described above.

A proximal end 40 of the first arm section 32 is pivotally mounted to the vehicle 12. To accommodate differences in truck box and trailer design and shape, a spacer 42 may be utilized to operably attach the first arm section 32 to the front wall on the vehicle 12. For example, the spacer 42 may compensate for the side of the vehicle 12 being oriented at a non-vertical orientation such as is found on certain trailers.

As shown assembled and mounted in FIGS. 1 and 2, the longitudinal axis of the second arm section 34 is oriented perpendicular or nearly perpendicular to the longitudinal axis of the first arm. As the roll shaft moves across the top of the vehicle and furls the cover, and the arm sweeps from right to left (as shown in FIG. 1) like the second hand of a watch (in counterclockwise direction as shown in the FIG. 1), the flexible elbow 35 bends. As a result, the angle between the longitudinal axes of the first and second arm sections varies. This accommodates the change in distance between the proximal end 40 of the first arm section and the roll shaft 24 as the roll shaft 24 is rolled or unrolled across the top of the vehicle.

A bore (not shown) extends through the arm assembly 30. A wire or wires running through the bore is substantially enclosed except for where it departs the opposite ends of the arm assembly 30. The bore thereby protects the wire(s) from exposure to the elements and other causes of premature deterioration or damage. At the distal end of the second arm section 34, the wires depart the arm and can be attached to the power studs 29 of the motor of the motor assembly 22.

The first arm section 32 and the second arm section 34 may each be fabricated from a rigid material that resists deformation when the motor 22 is operated to move the cover 20 between the rolled configuration and the unrolled configuration. The first arm section 32 and the second arm section 34 may each be fabricated from a metallic material.

In an alternative embodiment, the arm assembly 30 is pivotally and slidably mounted to the vehicle. Using such a configuration allows a distance between the pivot point and the distal end of the arm assembly 30 to vary as the arm assembly 30 is pivoted with respect to the vehicle.

FIGS. 3-6 show multiple views of the second arm section 34, motor mount 50 and motor assembly 22. The motor assembly 22 is operably attached to the distal end of the second arm section 34 utilizing a motor mount 50. A variety of mechanisms may be used for attaching the motor 22 to the motor mount 50, but it is typically bolted thereto. Preferably, the motor mount 50 includes apertures 54 used for securing the motor assembly 22 to the motor mount 50. The motor mount 50 includes a front wall 53 and a pair of side walls 55 that each extend from a base wall. The side walls 55 include ears 59 that project from the motor mount 50, and the ears may each include an aperture 51.

The motor mount 50 is fabricated from a rigid material that resists deformation when the motor 22 is operated to move the cover 20 between the rolled configuration and the unrolled configuration. The motor mount 50 may be fabricated from a metallic material, preferably aluminum. A single piece of aluminum can be formed or cut, and then bent to create the front wall 53 and side walls 55. A collar 61 is welded to the side walls 55 to provide additional security against movement of the motor assembly out of the mount 50, and protects the transmission 23 from collision or other damage in the field.

Connecting plate 63 is attached to the motor mount 50 by use of connecting plate flanges 65. In particular, the flanges 65 in the connecting plate and ears 59 in mount 50 are pivotally attached to one another. This is preferably accomplished by securing mounting bolts 67 and axles (not shown) through each of the two sets of apertures in the ears 59 and the flanges 65 that allow the mount 50 to pivot relative to the connecting plate and the second arm section 34 on which the connecting plate is attached. Thus is formed a pivotal attachment means or structure between the connecting plate on the arm and the motor mount on which the motor assembly is mounted.

Although allowing movement in a single plane, this pivot connection restricts rotation and movement of the mount 50 in other directions. That is, the pivoting movement of the mount 50 relative to the second arm section is restricted to a single plane. That plane will vary relative to an up-down, plumb line orientation as the motor assembly 22, second arm section 34 and roll shaft 24, move across the top of the vehicle. However, the plane of movement will not vary significantly relative to the plane defined by the second arm section 34 and the roll shaft 24. For the first embodiment, the movement of the mount 50 is restricted to the plane that is perpendicular to the plane defined by the second arm section 34 and the roll shaft 24.

A certain amount of pivotal movement is desired. Generally at least 10 degrees of movement is desirable to obtain the benefits contemplated herein. Preferably, 15 degrees of movement is provided. No additional structure is needed to prevent pivoting to too large an angle within the allowed plane. The maximum amount of pivotal movement experienced by the mount 50 is constrained by other structures and forces.

The pivotal connection of the motor mount 50, and thereby the motor assembly 22, relative to second arm section 34 allows movement that relieves stress otherwise experienced by those structures as when opening and closing the cover 20. The stress results, for example, if the portion of the shaft 24 near the motor is not oriented substantially parallel to an upper surface of the vehicle 12. This non-parallel relationship may be caused by a variety of factors such as if the shaft 24 is bent during use of the vehicle 12.

The motor mount 50 also facilitates operation where the upper arm 34 is not substantially perpendicular to motor 22 and shaft 24. This can occur when spacer 42 is not the optimal height, or when the front face of the trailer is not perpendicular to shaft 24.

The motor mount 50 thereby reduces or eliminates certain forces applied to the components of the rolling cover system 10 caused by a non-parallel configuration. Such forces could lead to premature degradation of the components of the rolling cover system 10. This degradation could result in catastrophic failure of the arm-shaft connection or require premature replacement of the components of the rolling cover system 10 at significant expense.

FIGS. 7-10 show a second embodiment that differs from the first embodiment in the orientation of the pivot of the mount 50 relative to the arm-shaft plane. The mount 50 and motor assembly are essentially the same. The differences relate to the orientation of the pivotal connection of the mount 50 to the second arm section 34. In the second embodiment, the end of the second arm section 34 is attached to the motor mount 50 by connecting plate 70. This plate has flanges 72 containing apertures. Those apertures align with apertures in the ears 59 of mount 50. Mounting bolts 67 and axles (not shown) placed through the apertures provide pivotal connection of mount 50 to the distal end of the second arm section 34.

The orientation of the pivotal movement in the second embodiment is rotated 90 degrees relative to the first embodiment. As with the first embodiment, the second arm section 34 and the roll shaft 24 define a single plane throughout the movement of the roll shaft 24 from an open position to a closed position. However, the second embodiment provides pivotal movement of the mount parallel to (or in the same plane as) the plane defined by the shaft 24 and second arm section 34.

In an alternative embodiment that does not use a hinge-type connection between the second arm section 34 and motor mount 50, the motor mount 50 may be fabricated from a resilient material that is flexible in response to forces placed on the motor 22 or motor mount 50 as the motor 22 moves the cover 20 between the rolled configuration and the unrolled configuration. One such resilient material is an elastomeric material such as rubber. The amount of desired flex of the mount 50 relative to the second arm section 34 should be at least 10 degrees, and preferably 15 degrees.

In the preceding detailed description, reference is made to the accompanying drawings, which form a part hereof, and in which is shown by way of illustration specific embodiments in which the invention may be practiced. It is to be understood that other embodiments may be utilized and changes may be made without departing from the scope of the present invention. The preceding detailed description, therefore, is not to be taken in a limiting sense, and the scope of the invention described herein is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A motorized rolling cover system for reversibly covering the top of an open-top vehicle, the system comprising:
   an arm having first and second sections, wherein the first section is attachable to an open-top vehicle;
   an elbow connecting the first section to the second section to allow the first section to bend with respect to the second section;
   an electric motor assembly attached to the second section of the arm opposite of the elbow;
   a pivotal attachment structure configured to attach the electric motor assembly to the second section of the arm to allow pivot movement of the electric motor assembly relative to the second section of the arm; and,
   a roll shaft attached to the electric motor assembly and adapted to roll and unroll a cover across the open top of the vehicle, the roll shaft being substantially perpendicular to the arm;
   wherein the pivotal attachment structure allows relative movement of the electric motor assembly in a plane perpendicular to a plane defined by the first section of the arm and the second section of the arm.

2. The motorized rolling cover system of claim 1 further comprising a motor mount, and wherein the motor is supported by the motor mount, and the motor mount is pivotally mounted to the second section of the arm opposite of the elbow.

3. The motorized rolling cover system of claim 1 wherein the electric motor assembly comprises an electric motor and a transmission.

4. The motorized rolling cover system of claim 3 wherein the electric motor assembly further comprises an output shaft.

5. The motorized rolling cover system of claim 3 wherein the electric motor assembly has a drive shaft, and the drive shaft is coaxial to the roll shaft.

6. The motorized rolling cover system of claim 1 wherein the pivotal attachment structure allows relative movement of the electric motor assembly within one plane.

7. The motorized rolling cover system of claim 1 wherein the second section of the arm is elongated with a longitudinal axis, and wherein the pivotal attachment structure allows relative movement of the electric motor assembly in a plane parallel to a plane defined by the arm and the roll shaft.

\* \* \* \* \*